G. AMBORN.
HOLDER FOR THREADING TOOLS OR THE LIKE.
APPLICATION FILED FEB. 8, 1912.

1,146,546.

Patented July 13, 1915.

WITNESSES:
René Buine
Fred White

INVENTOR
George Amborn,
By Attorneys,
Fraser, Turk & Myers

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

HOLDER FOR THREADING-TOOLS OR THE LIKE.

1,146,546.           Specification of Letters Patent.      Patented July 13, 1915.

Application filed February 8, 1912. Serial No. 676,411.

*To all whom it may concern:*

Be it known that I, GEORGE AMBORN, a citizen of the United States, residing in Chapinville, in the county of Litchfield and State of Connecticut, have invented certain new and useful Improvements in Holders for Threading-Tools or the like, of which the following is a specification.

This invention relates particularly to holders for threading tools, although it is applicable to tool holders of other kinds.

In various operations requiring the use of a threading tool it is desirable to use a tool holder having a slight degree of resilience or springiness. This is particularly true in nice work such as cutting taps or finishing other threaded work. Such spring tool holders have been heretofore provided, but usually as a separate device.

According to the present invention I provide a spring tool holder which is adapted to be easily and quickly stiffened, so that in effect it becomes a solid holder. In the preferred form of the device the holder is constructed with a tool carrying end which is connected to the shank of the tool by a portion of sufficient thinness to secure the necessary resiliency, and means are provided for connecting the head and body portion so as to secure a practically rigid connection between the head and shank.

The invention includes certain other improvements which will be hereinafter described.

Figure 1:
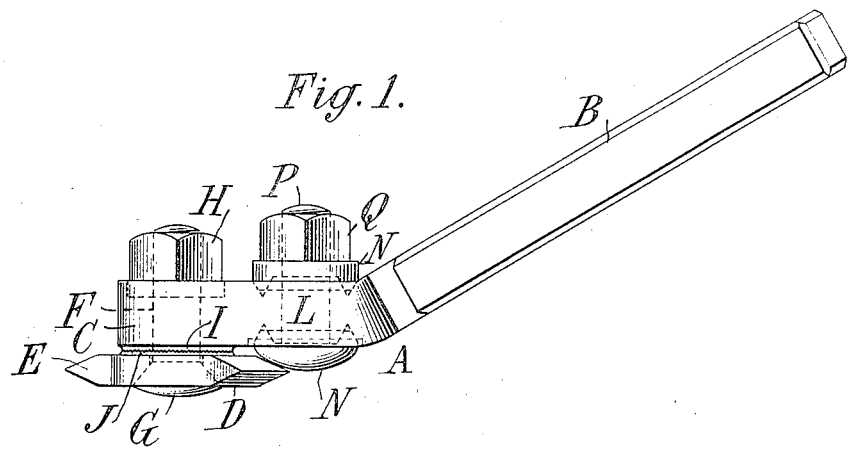
Figure 2:
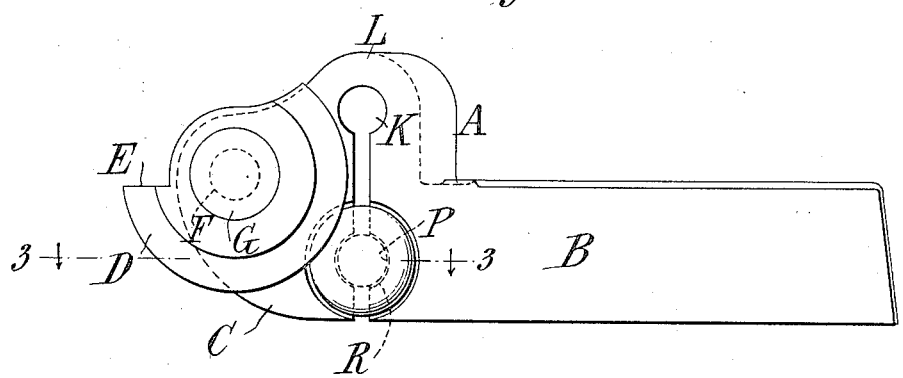
Figure 3:
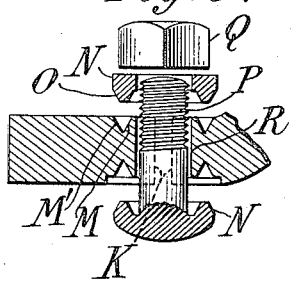

Referring to the drawings which illustrate one form of the invention,—Figure 1 is a side elevation. Fig. 2 is a top or plan view. Fig. 3 is a sectional view on the line 3—3 in Fig. 2, showing the parts detached.

In the drawings let A indicate the tool as a whole having a shank B and a head C which is designed to carry a tool D. The shank B and head C are preferably arranged at an angle to one another. The tool D is shown as a threading tool of common form, and comprises a disk-like member having a cutting face E. In this construction the tool is sharpened by grinding down the face E and turning the tool slightly upon its axis, which is usually a screw-threaded bolt F having a head G contacting with the outer face of the tool, and formed with a bevel portion on its under side which fits in a corresponding circular depression in the tool. The screw-threaded bolt passes through the head and is provided at its end with a nut H by means of which the bolt is tightened in place and the bolt is preferably provided with a rounded head and is preferably so arranged that the nut H will be on the inside of the angle between the shank and head. By this construction the projecting end of the bolt and the nut are located within the angle between the head and shank and thus in such position as to be less liable to catch in the clothes or injure the hands and arms of workmen. I prefer to form the face I of the head and the inner side J of the tool with a series of fine serrations, so that the tool may be adjusted to any position and be firmly held therein.

According to the present invention the tool holder has its head and shank joined by a resilient or spring connection, and this is best accomplished by forming a slot or cut-away portion K between the head and shank, preferably close to the tool. The slot is so proportioned that the connecting metal L which remains has sufficient springiness or resilience to enable the head to move slightly with relation to the shank B. As thus constructed, the tool constitutes an efficient spring tool adapted for work of great nicety.

My invention includes the provision of means by which the head and shank may be quickly and easily united by an adjustable member so that the resilience of the tool is temporarily neutralized. This may be accomplished in various ways, but I prefer the construction shown in which the head and shank are temporarily connected together in a rigid manner when it is desired to form in effect a solid tool. In the construction shown the head and shank are formed on each side of the cut-away portion or slot K with abutments M M' which are designed to be engaged by a bridge piece or bridge pieces N which are preferably formed with inclined portions O adapted to fit between the abutments M M'. The bridge piece N is of solid construction, and when in engagement it constitutes a rigid bridge between the head and shank. Preferably this construction is duplicated on each side of the tool, and the two bridge pieces N are clamped together by a bolt P and nut Q. The bridge pieces are preferably circular in form and one of them is preferably formed as the head of the bolt P. The bolt P is adapted to fit snugly through a hole R or circular enlargement of the slot K. When the nut Q is screwed home the bridge pieces are clamped tightly in position with the effect that a perfectly rigid connection is made between the shank and head of the tool holder.

The construction of abutments and flanges may advantageously be such that when the nut is screwed tight the head and shank are drawn toward each other slightly. The bolt may be of such dimensions relatively to the hole through which it passes that when the parts are thus drawn together they are clamped securely against the bolt.

When it is desired to use the tool as a spring tool the bolt and bridge pieces may be entirely removed, or the nut may be loosened sufficiently to obtain the spring action desired.

While I have shown in detail one form of the invention, it is to be understood that I do not wish to be limited thereto, as any changes may be made therein without departing from the spirit of the invention, as set forth in the appended claims.

What I claim is:—

1. A tool holder having a tool-carrying portion, a shank, and a resilient connection between the two, and means for rigidly connecting said portion and shank against forward and rearward movements.

2. A tool holder comprising a tool-carrying portion, a shank, and a resilient connection between the two, and clamping means transversely of the holder for connecting said tool-carrying portion rigidly to said shank.

3. A tool holder comprising a tool-carrying portion, a shank, and a resilient connection between the two, and clamping means transversely of the holder, having portions adapted to engage said tool-carrying portion and said shank, for connecting said parts rigidly together.

4. A tool holder comprising a tool-carrying portion, a shank, and a resilient connection between the two, a bolt transversely of the holder having portions adapted to engage said tool-carrying portion and said shank, and hold said parts rigidly together, and means for pressing said bolt and its engaging portions into engagement with said shank and tool-carrying portion.

5. A tool holder comprising a tool-carrying portion, a shank, and a resilient connection between the two, a bolt transversely of the holder having a head and portions on said head adapted to engage said tool-carrying portion and said shank, and hold said parts rigidly together, and means for pressing said bolt and its engaging portions into engagement with said shank and tool-carrying portion.

6. A tool holder comprising a tool-carrying portion, a shank, and a resilient connection between the two, and clamping means transversely of the holder adapted to hold said tool carrying portion and shank rigidly together, said tool-carrying portion, shank and clamping means having interengaging gibs and wedges.

7. A tool holder comprising a tool-carrying portion, a shank at an angle to said tool-carrying portion, a resilient connection between the two, and clamping means transversely of the holder having portions adapted to engage said tool-carrying portion and said shank for connecting said parts rigidly together, said means having a rounded head on the outside of the angle between the tool-carrying portion and shank, and a nut on the inside of the angle between said parts.

In witness whereof, I have hereunto signed my name in the presence of two subscribing witnesses.

GEORGE AMBORN.

Witnesses:
CHARLES B. HARRIS,
WILLIAM G. COLE.